(12) United States Patent
Paul et al.

(10) Patent No.: US 6,810,098 B1
(45) Date of Patent: Oct. 26, 2004

(54) FIFO READ INTERFACE PROTOCOL

(75) Inventors: Somnath Paul, Milpitas, CA (US); S. Babar Raza, Milpitas, CA (US)

(73) Assignee: Cypress Semiconductor Corp., San Josa, CA (US)

( * ) Notice: Subject to any disclaimer, the term of this patent is extended or adjusted under 35 U.S.C. 154(b) by 614 days.

(21) Appl. No.: 09/732,686

(22) Filed: Dec. 8, 2000

(51) Int. Cl.$^7$ .............................................. H04L 7/00
(52) U.S. Cl. ..................................................... 375/372
(58) Field of Search ................................. 375/372, 371; 711/116, 169; 712/200; 370/506; 710/38, 57

(56) References Cited

U.S. PATENT DOCUMENTS

| | | | |
|---|---|---|---|
| 5,138,637 A | * | 8/1992 | Fox ............................. 375/372 |
| 5,809,521 A | * | 9/1998 | Steinmetz et al. ........... 711/116 |
| 6,289,065 B1 | * | 9/2001 | Holt et al. .................... 375/372 |

OTHER PUBLICATIONS

Dynamically–Allocated Multi–Queue Buffers for VLSI Communication Switches☐☐Tamir, Y.; Frazier, G.L.;☐☐Computers, IEEE Transactions on, vol.: 41, Issue: 6, Jun. 1992, pp.: 725–737.*

An elastic pipeline mechanism by self–timed circuits, Komori; Takata; Tamura.; Asai; Ohno; Tomisawa; Yamasaki; Shima; Asada; Terada; Solid–State Circuits, IEEE Journal of , vol.: 23, Issue: 1, Feb. 1988, pp.: 111–117.*

The design and implementation of a multiqueue buffer for VLSI communication switches☐☐Frazier ; Tamir; Computer Design: VLSI in Computers and Processors, 1989. ICCD '89. Proceedings., 1989 IEEE International Conference on, Oct. 2–4, 1989, pp.: 466–471.*

S. Babar Raza et al., "Method and/or Architecture for Implementing Queue Expansion in Multiqueue Devices", Ser. No. 09/714,441, Filed: Nov. 16, 2000.

Somnath Paul et al., "FIFO Read Interface Protocol", Ser. No. 09/732,685, Filed: Dec. 8, 2000.

Somnath Paul et al., "Out–of–Band Look–Ahead Arbitration Method and/or Architecture", Ser. No. 09/732,687, Filed: Dec. 8, 2000.

S. Babar Raza et al., "Logic for Providing Arbitration for Synchronous Dual–Port Memory", Ser. No. 09/676,169, Filed: Sep. 29, 2000.

Jiann–Cheng Chen et al., "Configurable Fast Clock Detection Logic With Programmable Resolution", Ser. No. 09/775,372, Filed: Feb. 1, 2001.

S. Babar Raza et al., "Architecture for Implementing Virtual Multiqueue FIFOS", Ser. No. 09/676,704, Filed: Sep. 29, 2000.

S. Babar Raza et al., "Method and Logic for Storing and Extracting In–Band Multicast Port Information Stored Along With the Data in a Single Memory Without Memory Read Cycle Overhead", Ser. No. 09/676,171, Filed: Sep. 29, 2000.

S. Babar Raza et al., "Logic for Generating Multicast/ Unicast Address (ES)", Ser. No. 09/676,706, Filed: Sep. 29, 2000.

S. Babar Raza et al., "Logic for Initializing the Depth of the Queue Pointer Memory", Ser. No. 09/676,705, Filed: Sep. 29, 2000.

S. Babar Raza et al., "Method and Logic for Initializing the Forward–Pointer Memory During Normal Operation of the Device as a Background Process", Ser. No. 09/676,170, Filed: Sep. 29, 2000.

* cited by examiner

Primary Examiner—Stephen Chin
Assistant Examiner—Ted Wang
(74) Attorney, Agent, or Firm—Christopher P. Maiorana, P.C.

(57) ABSTRACT

An apparatus configured to interface a first clock speed of a multiqueue storage device and a second clock speed of an interface. The apparatus may be configured to control a flow of variable size data packets.

18 Claims, 7 Drawing Sheets

FIFO READ INTERFACE PROTOCOL

CROSS REFERENCE TO RELATED APPLICATIONS

The present application may relate to co-pending application Ser. No. 09/714,441, filed Nov. 16, 2000, Ser. No. 09/732,685, now U.S. Pat. No. 6,629,226 Ser. No. 09/732,687, now U.S. Pat. No. 6,715,021 Ser. No. 09/676,704, filed Sep. 29, 2000, Ser. No. 09/676,171, filed Sep. 29, 2000, now U.S. Pat. No. 6,578,118, Ser. No. 09/676,706, filed Sep. 29, 2000, Ser. No. 09/676,705, filed Sep. 29, 2000, now U.S. Pat. No. 6,631,455, Ser. No. 09/676,170, filed Sep. 29, 2000, now U.S. Pat. No. 6,581,144, and Ser. No. 09/676,169, filed Sep. 29, 2000, which are each hereby incorporated by reference in their entirety.

FIELD OF THE INVENTION

The present invention relates to a method and/or architecture for implementing a multiqueue first-in-first-out (FIFO) memory read interface generally and, more particularly, to a method and/or architecture for implementing a multiqueue FIFO read interface protocol for eliminating synchronizing problems for configuration dependent latencies where the protocol may be capable of handling variable size packets.

The present invention may also relate to a method and/or architecture for variable stage pipeline system generally and, more particularly, to a method and/or architecture for implementing an event driven variable stage pipeline system for handling variable size blocks that may have a minimum block size less than total round-time delay.

BACKGROUND OF THE INVENTION

Referring to FIG. 1, a diagram illustrating a conventional circuit 10 for exchanging data between a first-in-first-out (FIFO) device 12 and a read device 14 is shown. A read signal RD is presented from the read device 14 to the FIFO 12. After a fixed number of latency cycles, the signal DATA is presented to the read device 14. The signals READ_CLOCK and RD control the timing of the presentation of the data signal DATA.

Referring to FIG. 2, a diagram illustrating a conventional system 30 for exchanging data between a multiqueue FIFO 32 and a read device 34 is shown. The signal ADDRESS is a queue address configured to determine a queue number of the multiqueue FIFO 32. The signals READ_CLOCK and READ_EN control the timing of the presentation of the data signal DATA.

The read signal_RD in FIG. 1 is replaced by the read enable signal READ_EN in FIG. 2. The signal READ_EN controls whether to continue or to stop a particular read. The queue address signal ADDRESS is an additional signal not present in FIG. 1. Since there are multiple queues in the FIFO 32, a read occurs from the particular queue that is addressed by the signal ADDRESS.

Because of particular architectures (e.g., the cited co-pending applications) and specifications of particular devices, the latency between enabling the queue address signal ADDRESS and presenting the signal DATA can differ depending on the particular configuration. The configuration information needs to be written into the external read device 34. The only event reference available to the external read device 34 is an end of packet or a start of packet (EOP/SOP). In such an environment, the read device 34 is required to monitor this event to generate the queue address signal ADDRESS in a sufficient number of cycles ahead of the read.

The circuit 30 has the disadvantage of requiring a fixed packet size. The circuit 30 can be required to generate the queue address ADDRESS a certain number of cycles before the EOP occurs. The particular number of cycles is the same as the minimum latency requirement. For certain configurations, there is a specific latency between the queue address signal ADDRESS and presenting the signal DATA. If the packet size varies randomly, such as when the size of the packet is less than the number of cycles of latency, a read of one or more unwanted packets occurs. The circuit 30 additionally requires a pipeline memory (within the multiqueue 32) to handle variable sized packets in an asynchronous configuration.

It may also be difficult for the read device 34 to synchronize the queue address signal ADDRESS with the data received from the FIFO 32. Therefore, the read device 34 needs to be configured with enough logic to respond to the different latencies. Such a configuration requires extra overhead for the read device 34.

Handling of slow read clock speeds is also difficult within the circuit 30. The read operation occurs at one clock and the internal logic operates at another clock, such as the system clock (e.g., the cited co-pending application). This requires the queue address signal ADDRESS and the read enable signal READ_EN to be synchronized before other processing can be executed. The data read also needs to be synchronized. As a result, there is an uncertainty of 1–2 clock cycles resulting in the latency. This makes the synchronization between the queue address signal ADDRESS and the data read extremely difficult.

SUMMARY OF THE INVENTION

One aspect of the present invention concerns an interface coupled to a multiqueue storage device and configured to interface the multiqueue storage device with one or more handshaking signals. The multiqueue storage device and the interface may be configured to transfer variable size data packets.

Another aspect of the present invention concerns an apparatus configured to interface a first clock speed of a multiqueue storage device and a second clock speed of an interface. The apparatus may be configured to control a flow of variable size data packets.

The objects, features and advantages of the present invention include providing a method and/or architecture for implementing a multiqueue FIFO read interface protocol that may (i) eliminate synchronizing problems with configuration dependent latencies; (ii) be capable of handling variable size packets; (iii) allow back-to-back reads of variable size packets; (iv) exchange address and data between an external read device and a multiqueue storage device; (v) generate an address request for an external device from the storage device; (vi) generate a valid queue address in response to the address request; (vii) provide data in response to the valid queue address; (viii) provide a single clock domain or a dual clock domain between a multiqueue storage device and a read interface device; (ix) vary a latency between an address request and an address validate; (x) provide an event driven variable stage pipeline system; and/or (xi) handle variable size packets with a minimum packet size less than a total round-time delay.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
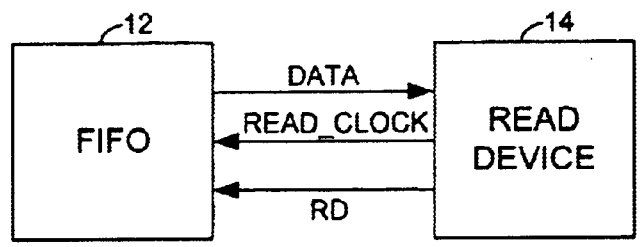
FIG. 1 is a block diagram of a conventional interface between a FIFO and a read device.
Figure 2:
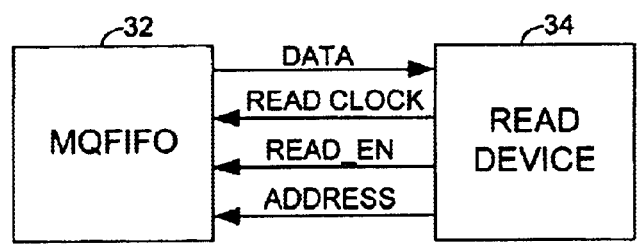
FIG. 2 is a block diagram of a conventional interface between a multiqueue FIFO and a read device.
Figure 3:
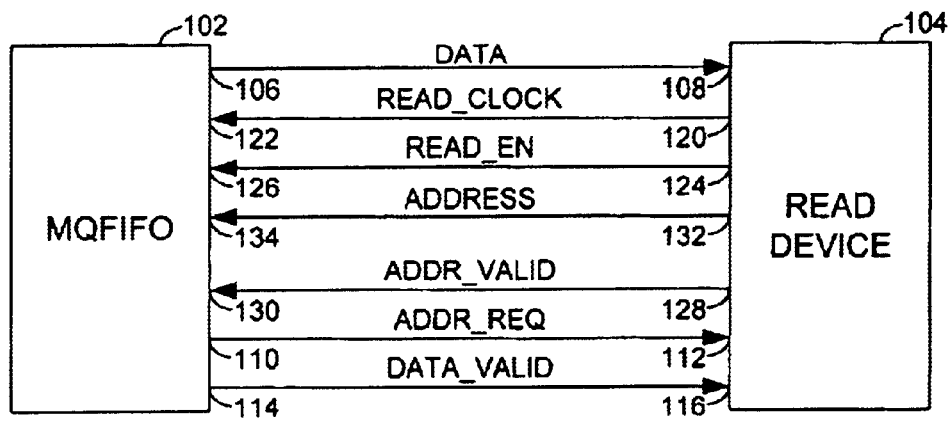
FIG. 3 is a block diagram of a preferred embodiment of the present invention.

Referring to FIG. 3, a block diagram of a system (or circuit) 100 is shown in accordance with a preferred embodiment of the present invention. The system 100 generally comprises a storage device 102 and a read device 104. The storage device 102 is generally implemented as a FIFO. In one example, the read device 104 may be implemented as an external read interface device (e.g., implemented externally from the FIFO 102). The FIFO 102 may be implemented as a single port device or a multiport device. The FIFO 102 may be implemented, in one example, as a multiqueue FIFO. However, other appropriate type storage devices may be implemented accordingly to meet the design criteria of a particular implementation.

The FIFO 102 may have an output 106 that presents a signal (e.g., DATA) to an input 108, an output 110 that presents a signal (e.g., ADDR_REQ) to an input 112 and an output 114 that presents a signal (e.g., DATA_VALID) to an input 116 of the read device 104. The read device 104 may have an output 120 that presents a signal (e.g., READ_CLOCK) to an input 122, an output 124 that presents a signal (e.g., READ_EN) to an input 126, an output 128 that presents a signal (e.g., ADDR_VALID) to an input 130 and an output 132 that presents a signal (e.g., ADDRESS) to an input 134 of the FIFO 102. The signal READ_CLOCK may be implemented as a read clock signal. The signal READ_EN may be implemented as a read enable signal. The signal ADDRESS may be implemented as a queue address signal. The signal ADDR_VALID may be implemented as a valid address indication signal. The signal ADDR_REQ may be implemented as an address request signal. The signal DATA_VALID may be implemented as a data validation signal. In one example, the various signals of the present invention may be implemented as handshaking signals. Specifically, the signals ADDR_VALID, ADDR_REQ and DATA_VALID may allow for variable size data packets and asynchronous operation.

The read device 104 may read various size packets from the multiqueue FIFO 102. The circuit 100 may accommodate different latency requirements between receiving the signal ADDRESS and presenting the signal DATA, depending on a particular configuration. The read device 104 may have to account for timing considerations of the system 100. The circuit 100 may illustrate an exchange of data (via variable size data packets) between the FIFO 102 and the read device 104.

The circuit 100 generally implements a handshaking protocol to transfer data. For example, the signal ADDR_REQ may request a next queue address. The signal ADDR_VALID may then be asserted to indicate that the queue address ADDRESS is valid in the current cycle. The signal DATA_VALID may then be asserted to indicate that the read data DATA is valid. Additionally, the read enable signal READ_EN may be modified, in order to indicate whether or not the read device 104 has space to continue with the read. Thus, the signal READ_EN may provide a "pause" feature of the circuit 100. The read enable signal READ_EN may allow the read device 104 to efficiently control reading of data from the multiqueue FIFO 102.

The read device 104 may generate the queue address signal ADDRESS and the queue address valid signal ADDR_VALID in response to the queue address request signal ADDR REQ. The queue address valid signal ADDR_VALID may be required for a case when the read device 104 may not be ready with a computation of a next queue address. Internal logic of the FIFO 102 (to be described in connection with FIGS. 4–6) may register the queue address signal ADDRESS at a certain time when the signal ADDR_VALID is valid. The signal DATA_VALID generally allows the read device 104 to know when to start and/or stop reading the data. The signal DATA_VALID may be implemented to synchronize the queue address ADDRESS with the signal DATA. Thus, the read data valid signal DATA_VALID is generally asserted when the signal DATA is presented.

The circuit 100 may allow accessing of variable size packets, where the minimum packet size may be less than a total round-time delay between a queue address request (e.g., the signal ADDR_REQ) and a queue address (e.g., the signal ADDRESS). One purpose of the circuit 100 may be to control the flow of queue addresses in order to read variable size packets in a two clock environment. For example, the read device 104 may be clocked by a different clock (e.g., an interface clock) then a system clock (e.g., a system clock of the circuit 100).

Figure 4:
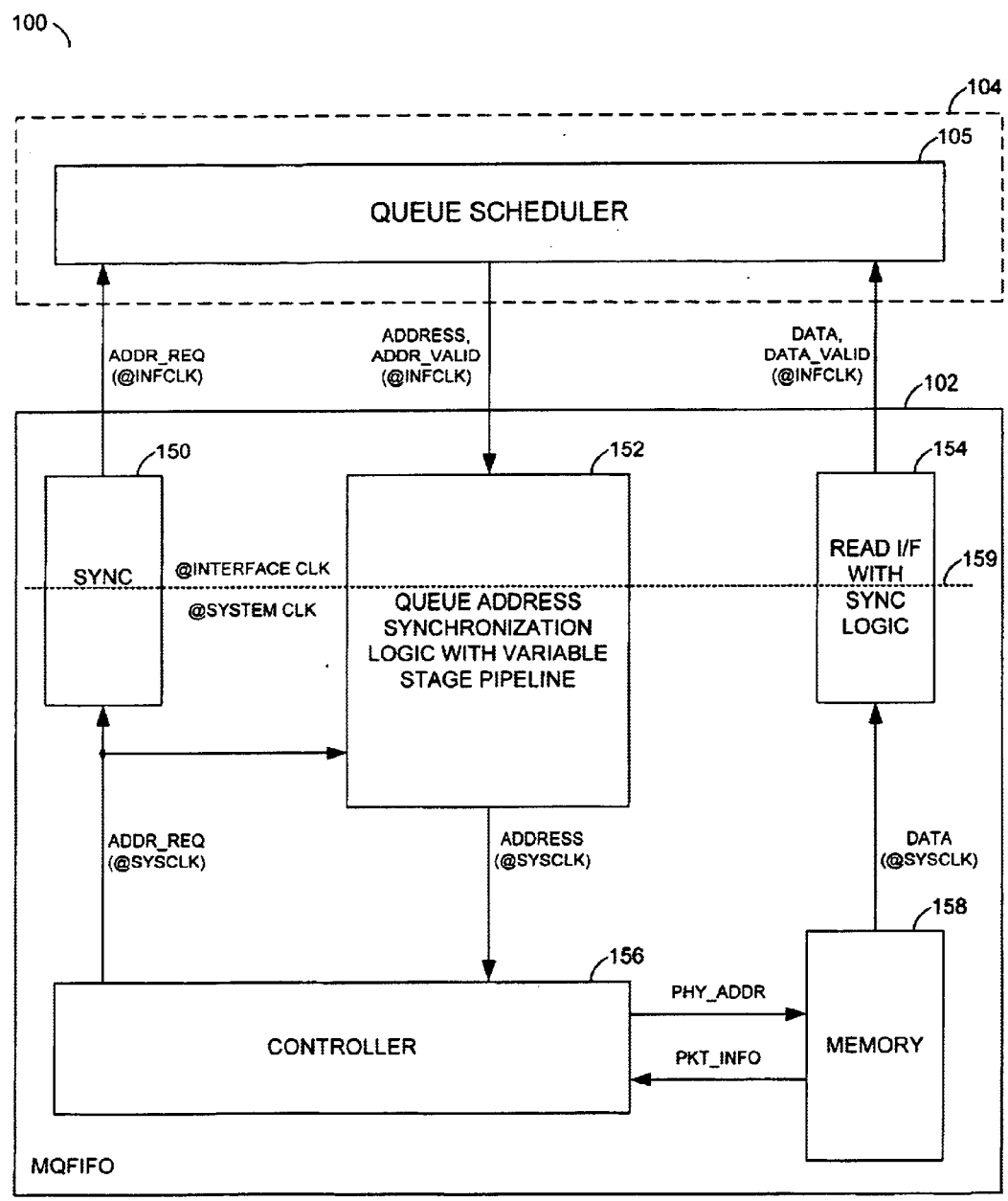
FIG. 4 is a block diagram of a preferred embodiment of the present invention.

Referring to FIG. 4, a detailed block diagram of the circuit 100 is shown. FIG. 4 may illustrate a flow of information of the circuit 100. The read device 104 may comprise a queue scheduler (or read control device) 105. A maximum delay for the queue scheduler 105 may be 4 cycles, since a minimum packet size of the circuit 100 may be 4 cycles. The maximum delay (4 cycles) may allow the queue scheduler logic 105 to be simplistic. For example, the queue scheduler logic 105 may not require a previous queue address request to be stored.

The multiqueue FIFO 102 generally comprises a block (or circuit) 150, a block (or circuit) 152, a block (or circuit) 154, a block (or circuit) 156 and a block (or circuit) 158. The circuit 150 may be implemented as a synchronization circuit. The circuit 152 may be implemented as an address circuit. The circuit 152 may provide queue addresses to the circuit 100. The circuit 152 may comprise synchronization logic that may provide a variable stage pipeline memory (to be discussed in connection with FIG. 5). The circuit 154 may be implemented as a read interface circuit. The circuit 154 may comprise synchronization logic. The circuit 156 may be implemented as a controller circuit (to be discussed further in connection with FIG. 6). The circuit 158 may be implemented as a memory circuit that may comprise a number of memory cells.

A dotted line 159 may illustrate a division between components operating at an interface clock (generally referred to as signal mains with the suffix "(@INFCLK)") and components operating at a system clock (generally referred to as signals with the suffix "(@SYSCLK)"). The controller 156 may present the signal ADDR_REQ (@SYSCLK) to the circuit 150 as well as to the circuit 152. The circuit 150 generally presents the signal ADDR_REQ (@INFCLK) to the circuit 104. The circuit 150 generally synchronizes the system clock domain and the interface clock domain for the signal ADDR_REQ(@INFCLK).

The circuit 152 generally presents the signal ADDRESS (@SYSCLK) to the controller 156. The controller 156 generally presents a signal (e.g., PHY_ADDR) to the memory 158 in response to the signal ADDRESS (@SYSCLK). The memory 158 generally presents a signal (e.g., PKT_INFO) to the controller 156 and data (e.g., the signal DATA(@SYSCLK)) to the read interface 154, while operating in the system clock domain. The interface 154 generally synchronizes the clock domain of read data to the interface clock domain as shown by the signals DATA (@INFCLK) and DATA(@SYSCLK).

Because of different latencies and variable size packets, the read device 104 may require stringent timing. The queue scheduler 105 may have difficulty predicting an appropriate time to (i) generate the signal ADDRESS and (ii) synchronize the read data DATA with the queue address signal ADDRESS. The FIFO 102 generally implements the controller 156 to control reading, and writing in such cases. As a result, the circuit 100 may read data packets in all such cases.

Figure 5:
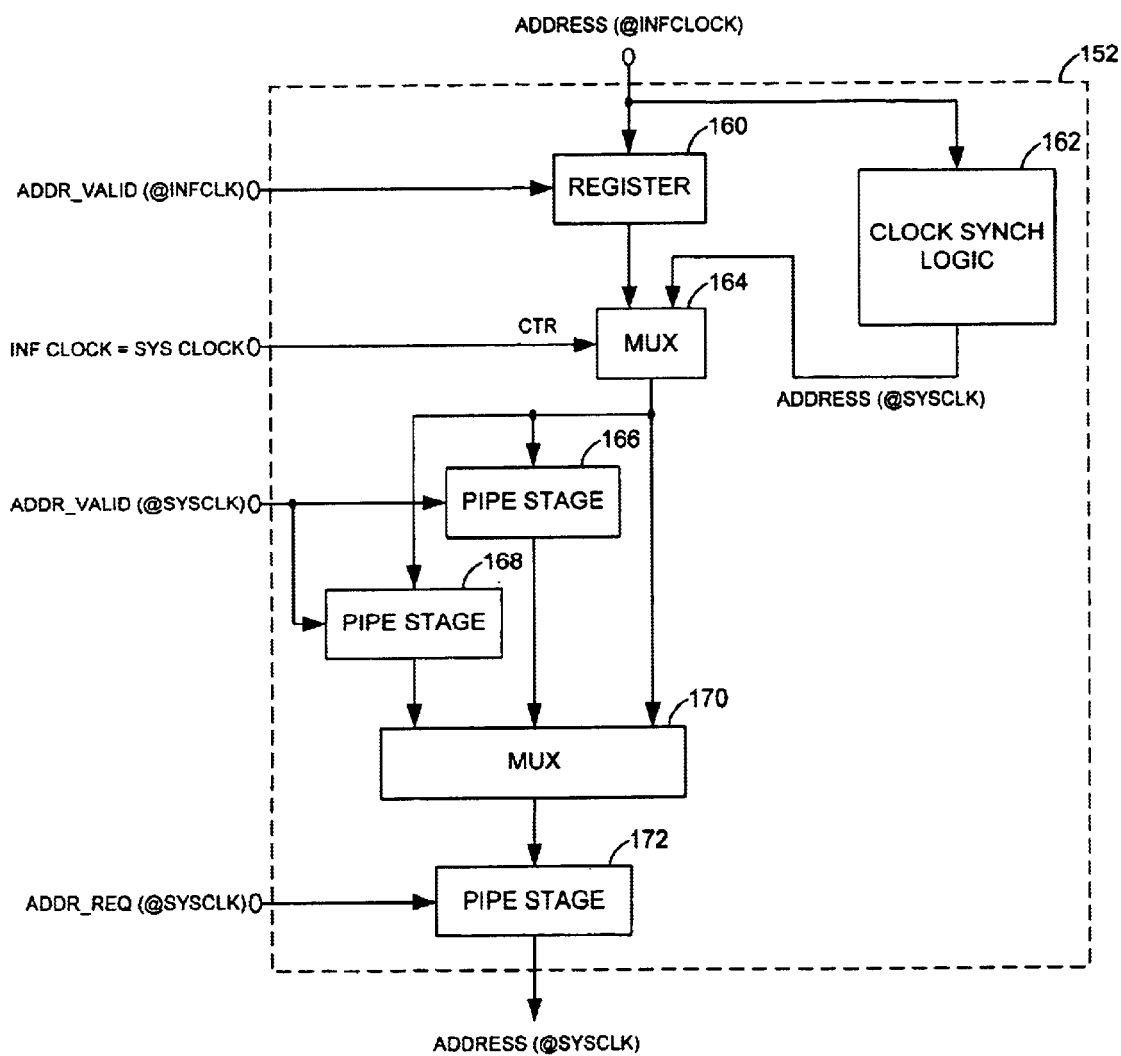
FIG. 5 is a detailed block diagram of a logic circuit of FIG. 4.

Referring to FIG. 5, a more detailed diagram of the queue address circuit 152 is shown. FIG. 5 illustrates a flow of the queue address ADDRESS within the address circuit 152, in response to a queue address request (e.g., the signal ADDR_REQ) and subsequent data flow. Additionally, the circuit 152 of FIG. 5 may illustrate an example implementation of event driven variable stage pipelining of the queue address ADDRESS. The queue address circuit 152 generally comprises a register 160, a clock synchronization logic block (or circuit) 162, a multiplexer 164, a pipeline stage 166, a pipeline stage 168, a multiplexer 170 and a pipeline stage 172. The register 160 and the logic circuit 162 generally receive the signal ADDRESS(@INFCLK). The register 160 may also receive the signal ADDR_VALID(@INFCLK). The multiplexer 164 may receive a signal from the register 160 and the signal ADDRESS(@SYSCLK) from the logic circuit 162.

The multiplexer 164 may present a signal to the pipeline stage 166, the pipeline stage 168 and the multiplexer 170, in response to a control signal (e.g., CTR) received at an input 165. The signal CTR is generally in an asserted stage when the interface clock is equivalent to the system clock. The pipeline stage 166 and the pipeline stage 168 may receive the signal ADDR_VALID(@SYSCLK). The pipeline stage 166 and the pipeline stage 168 are generally clocked by the signal ADDR_VALID(@SYSCLK). The multiplexer 170 generally presents a signal from either the pipeline stage 166, the pipeline stage 168 or the multiplexer 164 to the pipeline stage 172. The pipeline stage 172 is generally clocked by the signal ADDR_REQ(@SYSCLK). The pipeline stage 172 may then present the signal ADDRESS (@SYSCLK).

A detailed description of the flow of the queue address synchronization logic 152 will now be described. The queue address ADDRESS, if valid as indicated by the signal ADDR_VALID, is synchronized with respect to the system clock (e.g., at the clock synchronous logic block 162), before the queue address ADDRESS is registered (e.g., at the register 160). The queue address ADDRESS may then be passed through a variable stage pipeline via the multiplexer 164, the multiplexer 170, the pipeline stage 166 and the pipeline stage 168 and then read on the occurrence of a particular event (e.g., a transition of the signal ADDR_REQ (@SYSCLK)). The pipeline stages 166 and 168 may be written to when the queue address ADDRESS is valid via the signal ADDR_VALID. The pipeline stage 172 may be written to when the signal ADDR_REQ(@SYSCLK) is valid (e.g., when the controller 156 is ready to take a next address value). Additional pipeline stages may be added if the queue address information (e.g., the signal ADDRESS and the signal ADDR_VALID) need to be further processed before passing the queue address ADDRESS to the controller 156 for physical address computation.

A required pipeline depth of the circuit 152 (via the pipeline stages 166, 168 and/or 172) may be calculated as follows:

if "T" represents the total cycle time between an internal event (e.g., the queue address request signal ADDR_REQ before synchronization and the time when the queue address ADDRESS is available after synchronization) and "P" is the minimum size of the packet in terms of cycles, then the required pipeline depth is given by the following equation:

$$T/P \leq Pipeline\ Depth.$$

So, the pipeline depth may indicate how many queue addresses need to be stored in order to provide back-to-back reads of variable size packets. For example, if the value T (total cycle time) is 11 system clock cycles and the value P (minimum packet size allowed) is 4 cycles, a maximum of 3 (e.g., 11/4) stages of pipelining may be required. The value T may include a round-time synchronization delay and a maximum time taken by the queue scheduler 105 to generate and send the queue address ADDRESS in response to the address request signal ADDR_REQ. The pipeline stages 166, 168 and/or 172 may be variable to allow bypassing of the pipeline stages when not required, reducing latency on the address path.

The clock synchronization logic 162 may be bypassed (via the signal CTR) when the interface and system clocks are same in phase and frequency. The synchronized queue select address (e.g., the signal ADDRESS(@SYSCLK)) is passed either directly to the pipeline stage 172, or through the pipeline stage 166 if the pipeline stage 172 still contains a valid address, or through the pipeline stage 168, if the pipeline stage 166 is full. The address ADDRESS (@SYSCLK) is then read when the controller 156 is ready to read the next packet in response to the signal ADDR_REQ(@SYSCLK). The queue address ADDRESS is typically read when the end of a previous packet read is detected, or the first packet has to be read (to be described in connection with FIG. 6).

Figure 6:
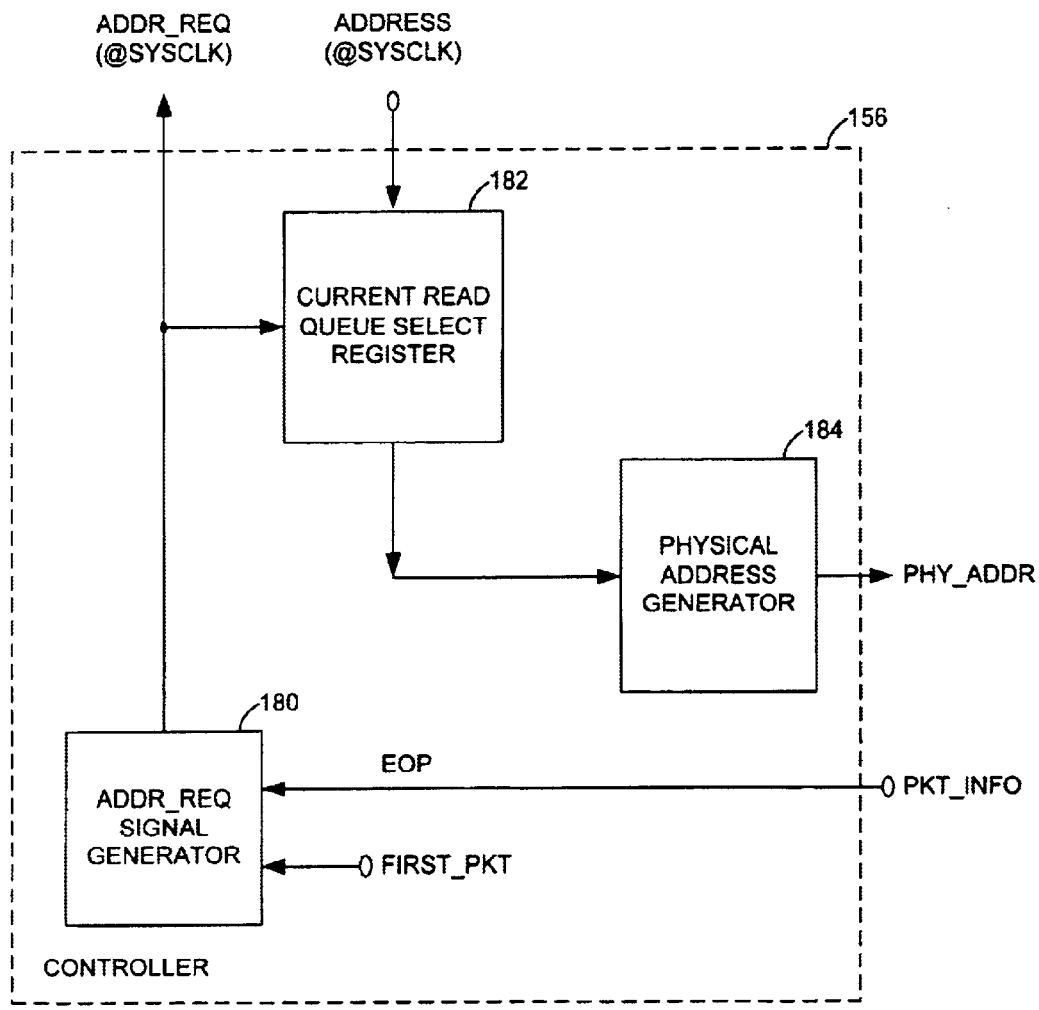
FIG. 6 is a detailed block diagram of a controller circuit of FIG. 4.

Referring to FIG. 6, block diagram showing an implementation of the controller 156 involving generation of the physical address PHY_ADDR and address request ADDR_REQ generation is shown. The controller 156 generally comprises a generator block (or circuit) 180, a register block (or circuit) 182 and a generator block (or circuit) 184. The queue address ADDRESS is registered at the register 182 to prevent the address ADDRESS from changing while reading a current packet. The address ADDRESS is generally then sent to the address generator 184 which computes a physical address (e.g., the signal PHY_ADDR) for reading the packet from the memory 158. The signal ADDR_REQ is also computed based on end of packet information (e.g., EOP), or if a packet (e.g., FIRST_PKT) needs to be transferred. The packet FIRST_PKT may be internally generated.

The queue address request signal ADDR_REQ is generally internally generated on an occurrence of an event. In one example, the event may be an early detection of an end of packet (via the signal EOP) while reading from the internal memory or when the first packet transfer needs to occur (via the signal FIRST_PKT). The event may trigger a request for the next queue address. The signal ADDR_REQ may be synchronized with respect to a read clock (e.g., the interface clock INFCLK) and presented to the queue scheduler 105. The queue scheduler 105 may require a predetermined number of cycles to return an address (e.g., the queue address ADDRESS). For example, synchronization may take 1–4 cycles after detecting the synchronized request signal (e.g., the signal. ADDR_REQ).

Figure 7:
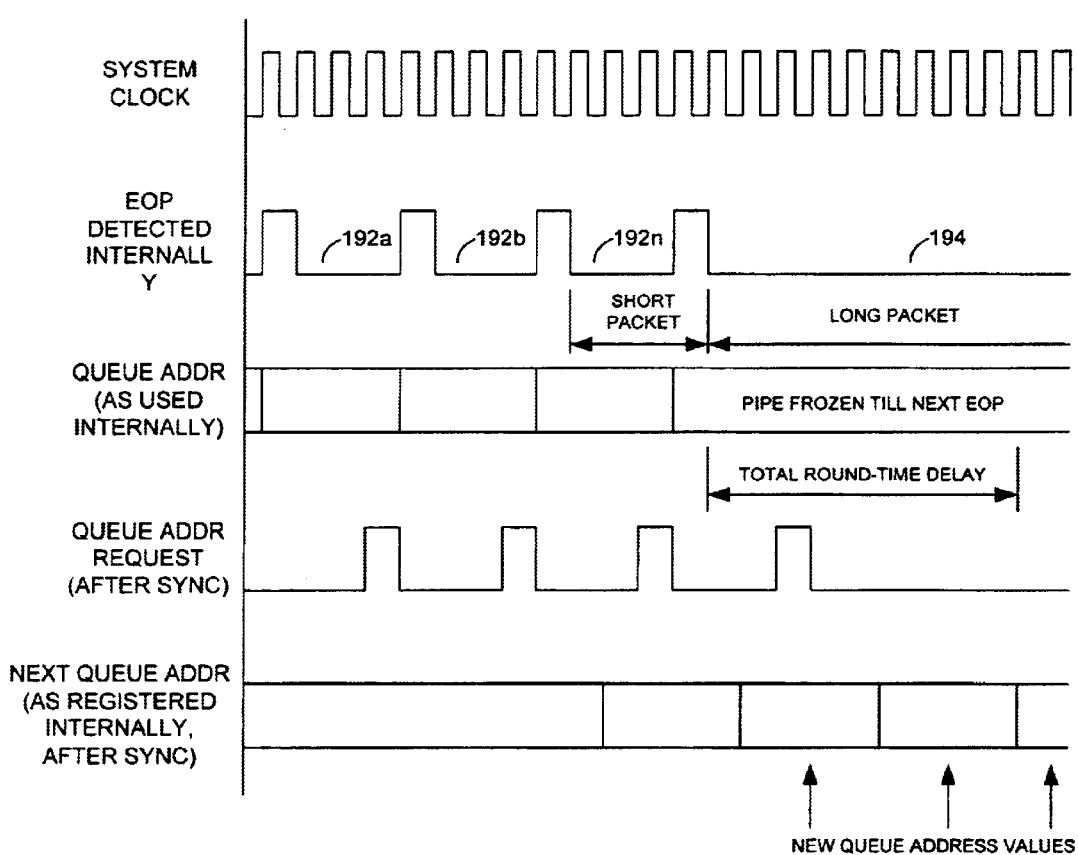
FIG. 7 is a timing diagram illustrating an operation of the present invention.

Referring to FIG. 7, a timing diagram 190 illustrating requirements of internal pipelining of queue addresses, in order to have back-to-back reads of variable size packets is shown. The timing diagram 190 may illustrate example timings demonstrating why the pipelining stages 166, 168 and/or 172 are required to store extra queue select addresses. The timing diagram 190 may illustrate a case where a sequence of smaller sized packets 192a–192n (4 cycles as in the diagram) is followed by a long packet 194. In such a case, the internal pipeline may be frozen after processing the last small packet 192n. The last few small packets may result in a similar sequence of the next queue addresses. Because of a larger round-time delay (due to synchronization, and delay due to address validation), the new queue addresses need to be stored. The stored queue addresses may be used at an end of the long packet 194. IF the long packet 194 ended after the second new queue address has arrived (as indicated in the timing diagram 190), storage of 2 new queue select addresses instead of 3 queue addresses may be required with respect to the timing diagram 190.

Figure 8:
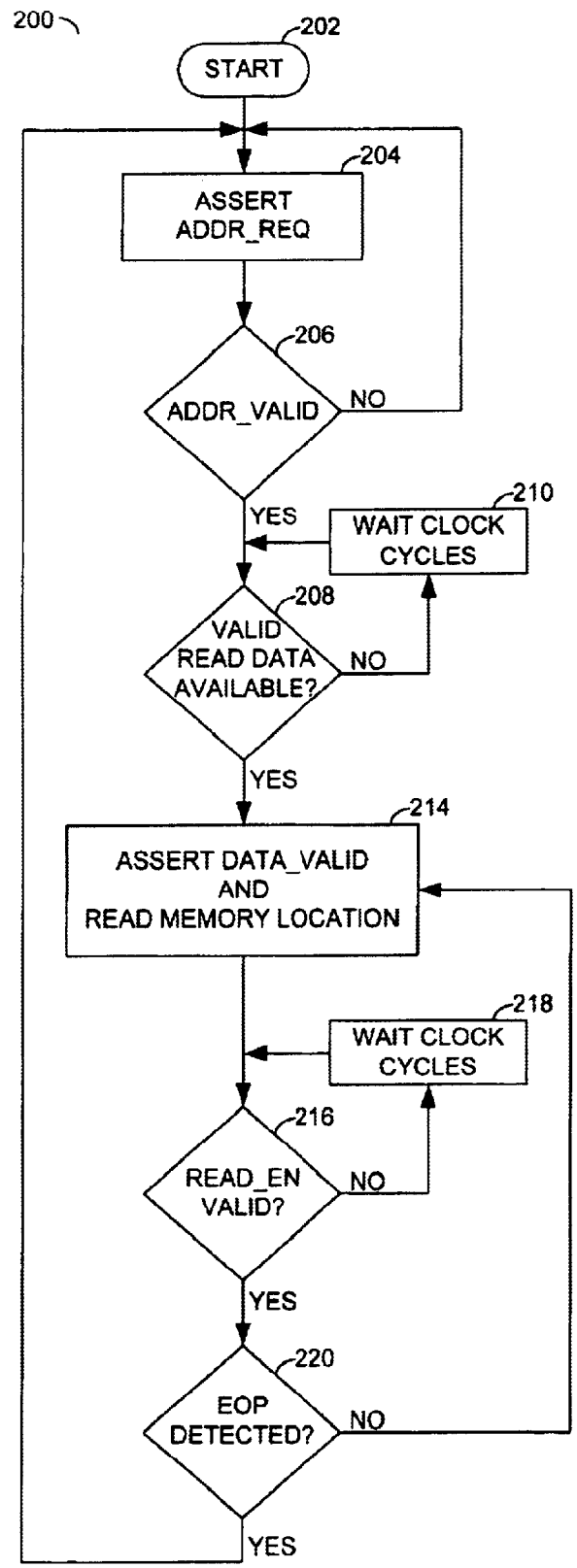
FIG. 8 is a flow diagram illustrating an operation of the present invention.

Referring to FIG. 8, a flow diagram of a method (or process) 200 illustrating the interaction of the various signals of the circuit 100 is shown. The process 200 generally has a start state 202, a state 204, a decision state 206, a decision state 208, a state 210, a state 212, a state 214, a decision state 216, a state 218 and a decision state 220. The state 202 generally begins the process 200. Next, the state 204 asserts the signal ADDR_REQ. The decision state 206 then determines if the signal ADDR_VALID is active (e.g., ON, or a digital "1"). If the signal ADDR_VALID is not active (e.g., OFF, or a digital "0"), the process 200 returns to the state 204. If the signal ADDR_VALID is active, the process 200 continues to the decision state 208. If the decision state 208 determines that valid read data is not available, the state 210 waits until valid read data is available and returns to the state 208. If the state 208 determines that valid read data is available, the state 214 asserts (e.g., turns on) the signal DATA_VALID and initiates a read of a memory location. Next, if the state 216 determines that the signal READ_EN is not valid (e.g., enabled), the state 218 waits one or more clock cycles and returns to the state 216. If the state 216 determines that the signal READ_EN is valid, the state 220 then determines if an end of packet is detected. If an end of packet is not detected, the process 200 returns to the state 214. If an end of packet is detected, the process 200 returns to the state 204.

The queue address signal ADDRESS is registered to be a valid transfer only if the request for next queue address has been activated and the queue address valid signal ADDR_VALID is also activated at the time the address is supposed to have been received. The queue address signal ADDRESS passes through internal pipeline stages before the data is read out from the memory 158. When data is detected as valid data, the read data valid signal DATA_VALID is activated to indicate that the data on the read data bus is valid. The memory read of the packet continues, until an end of packet is detected. When an end of packet EOP is detected, the next address request is generated, and the process 200 continues. A pause may be implemented by deactivating the signal READ_EN (e.g., the memory read may be paused while the signal READ_EN is deactivated).

Figure 9:
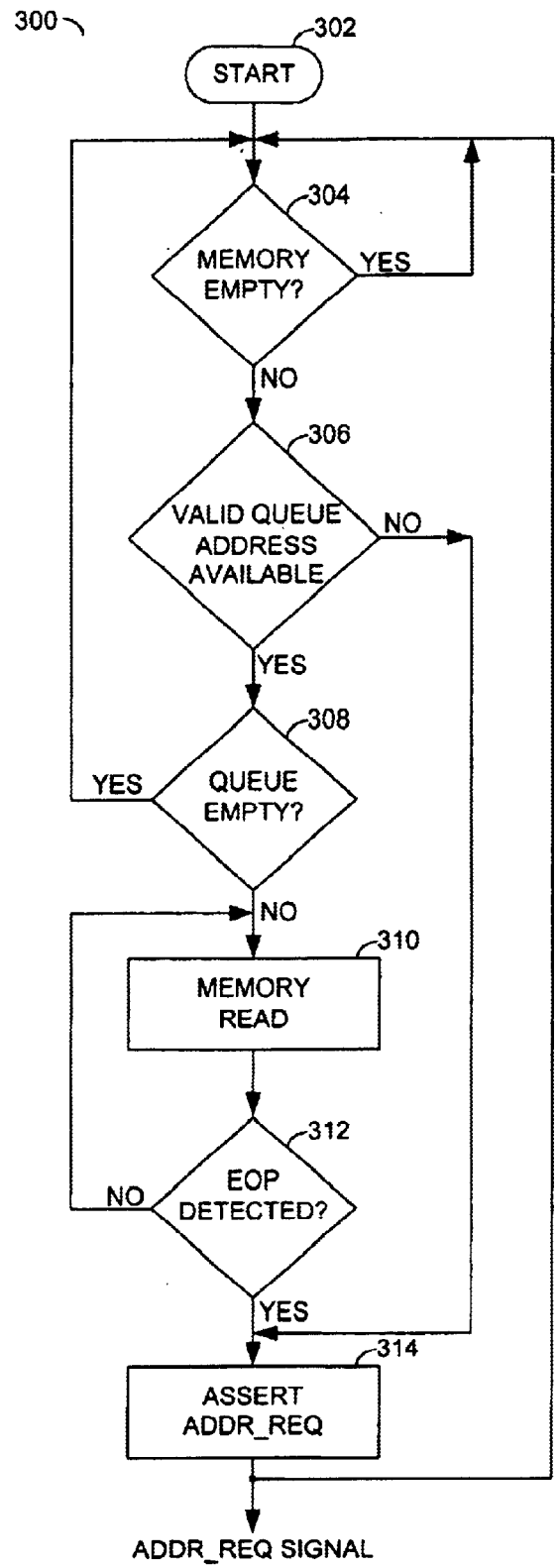
FIG. 9 is a flow diagram illustrating an operation of the present invention.

Referring to FIG. 9, a method (or process) 300 for generation of next queue address request signal ADDR_REQ is shown. The method 300 generally comprises a start state 302, a decision state 304, a decision state 306, a decision state 308, a state 310, a decision state 312 and a state 314. The state 302 generally starts the method 300. The state 304 determines if the memory 158 is empty, and if so, the method 300 returns to the state 304. In one example, one or more clock cycles may pass before the state 304 checks the status of the memory 158. The particular number of clock cycles may be adjusted accordingly to meet the design criteria of a particular implementation. In one example, the number of clock cycles may be programmed. In such an example, if the state 304 determines that the memory 158 is empty, the process 300 would first retreat to the state 302 before reducing the status of the memory 158.

If the decision state 304 determines that the memory is not empty, the state 306 then determines if a valid queue address is available. If a valid queue address is not available, the method 300 moves to the state 314 where the signal ADDR_REQ is asserted. If a valid queue address is available, the decision state 308 determines if the queue is empty. If the queue is empty, the method 300 returns to the state 304. If the queue is not empty, the state 310 reads from the memory 158. Next, the decision state 312 determines if an end of packet is detected. If an end of packet is not detected, the method 300 returns to the state 310 and waits until the end of packet EOP is detected. If an end of packet is detected, the state 314 asserts the signal ADDR_REQ.

The start state 302 begins when the memory 102 is nonempty. The queue address is registered depending on the status of the signal ADDR_VALID. If the signal ADDR_VALID is not valid and the memory 158 is non-empty, the queue address request signal ADDR_REQ continues to be generated until a queue address value is registered. The loop in the state 304 may also help in initiating the address request signal ADDR_REQ. The signal ADDR_REQ may be generated first when the packet FIRST_PKT is ready to be read. The address starts the packet read from the memory 158. If the queue is found to be empty, the process restarts, and no packet read takes place. When an end of packet occurs, the next queue address request is generated and the process restarts again.

The present invention may provide a method for exchanging address and data signals between the external read device 104 and the multiqueue storage element 102. The multiqueue storage element 102 is generally responsible for generating an address request that may be presented to the external read device 104. The external read device 104 may generate a valid queue address (e.g., the signal ADDR_VALID) in response to an address request (e.g., the signal ADDR_REQ). The multiqueue storage device 102 may then provide valid data (e.g., the signal DATA_VALID and the signal DATA), in response to the valid queue address. The multiqueue storage element 102 and the read device 104 may be in a single clock domain or different clock domains. Data exchange between the multiqueue storage device 102 and the read interface 104 may be of variable packet sizes. The latency between the address request signal ADDR_REQ and the address valid signal ADDR_VALID may be varied. The latency between the address valid signal ADDR_VALID and the data valid signal DATA_VALID may be varied. The present invention may allow back-to-back reads of variable size data packets. Additionally, the present invention may provide a logic for controlling the flow of information in a two clock system having variable size data packet handling capacity.

The present invention may handle any data packet size, without losing bandwidth. For example, latency of the circuit 100 may vary due to a particular configuration (e.g., read clock, if it is not same as system clock or when width/depth expansion is supported). However, the queue scheduler 105 may not be responsible for generating the queue addresses according to the particular configuration. Therefore, the read device 104 (e.g., the queue scheduler 105) may not need to be informed of the configuration of the multiqueue FIFO 102. Thus, slower read clocks may be used. Although there may be an uncertainty with the latency of the circuit 100 when the read interface clock INFCLK is a slower clock, the read device 104 may synchronize the signal DATA with the queue address ADDRESS with the read data valid signal DATA_VALID.

The function performed by the flow diagrams of FIGS. 8–9 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a multiqueue storage device operating at a first clock speed; and
    an interface operating at a second clock speed, wherein said apparatus is configured to (i) control a flow of variable size data packets between said interface and said multiqueue storage device and (ii) vary a latency between an address request indication and an address validate indication.

2. The apparatus according to claim 1, wherein said apparatus is configured to provide an event driven variable stage pipeline system.

3. The apparatus according to claim 1, wherein said apparatus is configured to handle said variable size data packets with a minimum block size less than a total round-time delay.

4. The apparatus according to claim 1, wherein said apparatus is further configured to synchronize said first and second clock speed.

5. The apparatus according to claim 1, wherein said apparatus comprises:
    a request synchronization logic configured to synchronize an address request signal with said second clock speed.

6. The apparatus according to claim 1, wherein said apparatus comprises:
    an address synchronization logic configured to synchronize an address signal with said first clock speed.

7. The apparatus according to claim 1, wherein said apparatus comprising:
    a data synchronization logic configured to synchronize data with said second clock speed.

8. The apparatus according to claim 1, wherein said apparatus comprises:
    a memory configured store one or more physical addresses and packet information.

9. The apparatus according to claim 1, wherein said apparatus comprises:
    a controller configured to control an operation of said apparatus.

10. The apparatus according to claim 9, wherein said controller is configured to control addresses and data of said multiqueue storage device.

11. An apparatus comprising:
    means for interfacing a first clock speed of a multiqueue storage device and a second clock speed of an interface; and
    means for controlling a flow of variable size data packets and varying a first latency between (i) an address request indication and (ii) an address validate indication.

12. A method for controlling a flow of data, comprising the steps of:
    (A) interfacing a first clock speed of a multiqueue storage device and a second clock speed of an interface; and
    (B) controlling a flow of variable size data packets and varying a first latency between (i) an address request indication and (ii) an address validate indication.

13. The method according to claim 12, wherein step (B) further comprises varying a second latency between said address validate indication and a valid data indication.

14. The method according to claim 12, wherein step (A) further comprises:
    providing an event driven variable stage pipeline system.

15. The method according to claim 12, wherein step (A) further comprises:
    handling said variable size data packets with a minimum packet size less than a total round-time delay.

16. The method according to claim 12, wherein step (A) further comprises:
    synchronizing said first and second clock speed.

17. An apparatus comprising:
    a multiqueue storage device operating at a first clock speed; and
    an interface operating at a second clock speed wherein said apparatus is configured to (i) control a flow of variable size data packets between said interface and said multiqueue storage device and (ii) handle said variable size data packets with a minimum block size less than a total round-time delay.

18. A method for controlling a flow of data, comprising the steps of:
    (A) interfacing a first clock speed of a multiqueue storage device and a second clock speed of an interface for handling said variable size data packets with a minimum packet size less than a total round-time delay; and
    (B) controlling a flow of variable size data packets.

* * * * *